US006175080B1

(12) United States Patent
Nightingale

(10) Patent No.: US 6,175,080 B1
(45) Date of Patent: Jan. 16, 2001

(54) STRAIN RELIEF, PULL-STRENGTH TERMINATION WITH CONTROLLED IMPEDANCE FOR AN ELECTRICAL CABLE

(75) Inventor: Mark W. Nightingale, Washougal, WA (US)

(73) Assignee: Tektronix, Inc., Beaverton, OR (US)

( * ) Notice: Under 35 U.S.C. 154(b), the term of this patent shall be extended for 0 days.

(21) Appl. No.: 09/300,980

(22) Filed: Apr. 28, 1999

(51) Int. Cl.[7] .................... H02G 15/06
(52) U.S. Cl. .................... 174/75 C; 174/84 C; 174/78
(58) Field of Search .................... 174/74 R, 74 C, 174/78, 84 C; 439/98, 99, 877, 882

(56) References Cited

U.S. PATENT DOCUMENTS 2,499,296 * 2/1950 Buchanan .................... 174/74 R
3,141,924 7/1964 Forney, Jr. .
3,315,218 4/1967 Aker .
3,517,375 * 6/1970 Mancini .................... 439/877
3,828,298 8/1974 Schumacher .
3,869,187 * 3/1975 Bingham .................... 439/98
5,025,554 * 6/1991 Dohi .................... 439/877 X
5,061,892 10/1991 O'Hara .
5,073,128 * 12/1991 Sirai et al. .................... 439/877 X
5,516,311 * 5/1996 Maejima .................... 439/877
5,962,812 * 10/1999 Miyazaki .................... 174/78

* cited by examiner

*Primary Examiner*—Kristine Kincaid
*Assistant Examiner*—Chau N. Nguyen
(74) *Attorney, Agent, or Firm*—William K. Bucher

(57) ABSTRACT

A strain relief and pull-strength termination with controlled impedance for a transmission cable has a carrier with a flat portion for accepting one end of the cable and tabs extending from the flat portion. The cable is secured to the flat portion via soldering of the shielding conductor to the flat portion or by glueing. A housing having tabs formed therein receives the carrier. The tabs in the housing are bent down to engage the carrier tabs to provide strain relief and cable-pull strength.

10 Claims, 2 Drawing Sheets

STRAIN RELIEF, PULL-STRENGTH TERMINATION WITH CONTROLLED IMPEDANCE FOR AN ELECTRICAL CABLE

BACKGROUND OF THE INVENTION

The present invention relates generally to terminations for transmission cables and more particularly to a strain relied, pull-strength termination with controlled cable impedance usable in a measurement test probe.

A commonly used design for measurement test probes is an electrically conductive elongate body made of nickel plated brass having a substrate disposed therein. The substrate contains either passive or active circuitry to minimize probe loading and to terminate the probe in the characteristic impedance of the measuring device. The elongate electrically conductive body has a probing tip at one end that is secured in the body by and insulating plug. The probing tip extends through the insulating plug and is exposed within the conductive body. The substrate is electrically connected to the probing tip by electrically conductive elastomeric material or other such conventional connecting methods. Surrounding a substantial portion of the conductive body is an insulating material, such as injected molded plastic parts. Various methods are used for attaching the plastic parts to the tubular body, such as press fitting, gluing, or injection molding of the plastic directly onto the body. The plastic parts are generally formed with an outwardly extending flange that serves as a finger stop and guard. The plastic parts also serve as an outer housing for securing a transmission cable to the probe.

The transmission cable has a central conductor encased in an dielectric material and surrounded by an outer conductive shielding material. The outer conductive shielding material is covered by a insulating material. Generally, the outer shielding material is of finely braided wires. The central conductor is electrically connected to the substrate and the outer shielding material is electrically connected to the electrically conductive body. Many apparatus and methods are employed for connecting the transmission cable to the measurement test probe.

One such apparatus and method is described in U.S. Pat. No. 5,061,892, titled "Electrical Test Probe Having Integral Strain Relief and Ground Connection", and assigned to the assignee of the present invention. A strain relief adapter is provided that has a tubular shaped member and a flat surface portion that transitions from the tubular member. The flat surface portion is secured to the substrate of the measurement probe. The outer insulating material of the transmission cable is removed and the outer conductive shielding material is folded back over the outer insulating material and positioned in the tubular member of the strain relief. The substrate and strain relief adapter are inserted into the electrically conductive elongate body and the conductive body is crimped at the location of the tubular member of the strain relief adapter using an appropriate crimping tool to capture and secure the transmission cable within the electrically conductive elongate body.

U.S. Pat. No. 3,828,298, titled "Electrical Terminal for a Braided Shied on a Coaxial Cable", describes and electrical terminal for grounding the braided shield of a coaxial cable. The terminal includes a generally U-shaped braided shield ferrule-forming portion and an integrally formed wire barrel. The wire barrel includes a base portion and a pair of upstanding sidewalls extend from opposite sides of the base portion. The U-shaped braided shield ferrule-forming portion includes a base portion and upstanding sidewalls on either side of the base portion. A pair of lances are stamped out of each sidewalls and are integral with the base portion. A coaxial cable is prepared for the electrical terminal by removing a portion of the outer insulating jacket and exposing the braided shield. A portion of the exposed braided shield is removed to expose the insulating material surrounding the center conductor. A portion of the insulating material is removed to expose the center conductor. The prepared coaxial cable is aligned over the terminal with the exposed braided shield directly over the ferrule-forming portion. The coaxial cable is forced down onto the terminal with the lances piercing the braided shield. The sidewalls of the wire barrel and the ferrule-forming portion are respectively crimped around the insulating jacket and the braided shield.

A major drawback to these and other similar types of design is that the coaxial cable or transmission cable is crimped, in part, to provide the strain relief and pull-strength on the cable. Such crimping causes changes in the characteristic impedance of the coaxial cable or transmission cable at the crimping location. The impedance changes in the coaxial cable adversely affects the overall bandwidth characteristics of the measurement test probe. With the bandwidth requirements of measurement test probes exceeding 3 GHZ., a new design is needed for providing strain relief and pull-strength for transmission cables used with measurement test probes that does not affect the characteristic impedance of the transmission cable.

SUMMARY OF THE INVENTION

Accordingly, the present invention is to a strain relief and pull-strength termination with controlled impedance for a transmission cable having a carrier with a flat portion and a tab portion extending from the flat portion. One end of the cable is secured to the carrier using well known fixing techniques, such as gluing, soldering or the like. A housing receives the carrier and has a tab formed therein that is movable from a first to a second position with the housing tab engaging the carrier tab in the second position. In the preferred embodiment of the invention the carrier has an axial dimension and a plurality of tab portions extend upward from the flat portion parallel with the axial dimension. The transmission cable may be a coaxial cable having a center conductor surrounded by a shielding conductor with an insulating material separating the center conductor from the shielding conductor and the carrier may be formed of a electrically conductive material with the shielding conductor being soldered to the electrically conductive material.

The strain relief and pull-strength termination with controlled impedance may be used in a probe head for an electrical measurement probe that includes a carrier having first and second flat portions and a tab portion extending from one of the flat portions. One end of the cable is secured to the second flat portion of the carrier using well known fixing techniques, such as gluing, soldering or the like. A substrate is mounted and secured to the first flat portion of the carrier and is electrically connected to the transmission cable. A housing receives the carrier and has a tab formed in the housing that is movable from a first to a second position with the housing tab engaging the carrier tab in the second position. A probing tip extends from one end of the housing and electrically connected to the substrate. The carrier has an axial dimension and a plurality of tab portions extend upward from one of the flats portion parallel with the axial dimension. In the preferred embodiment of the invention, the plurality of tab portions extend upward from the second flat portion. The transmission cable may be a coaxial cable having a center conductor surrounded by a shielding conductor with an insulating material separating the center conductor from the shielding conductor and the carrier may be formed of a electrically conductive material with the shielding conductor being soldered to the electrically conductive material. Preferably a body of insulating material surrounds the housing and a portion of the cable extending from the housing.

The objects, advantages and novel features of the present invention are apparent from the following detailed description when read in conjunction with appended claims and attached drawings.

DETAILED DESCRIPTION OF THE PREFERRED EMBODIMENT

Figure 1:
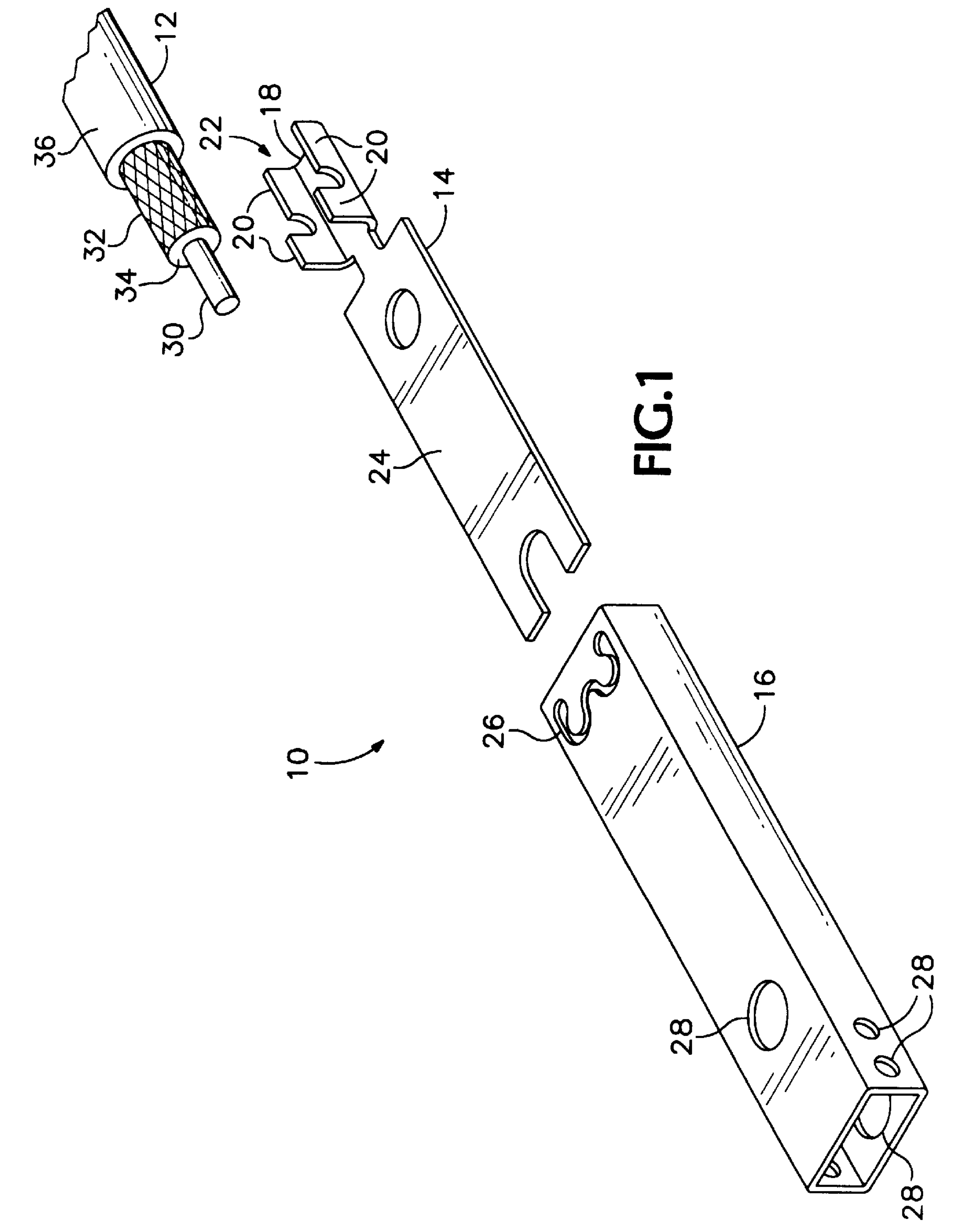
FIG. 1 is an exploded perspective view of strain relief and pull-strength termination with controlled cable impedance according to the present invention.

Referring to FIG. 1 there is shown an exploded perspective view of a strain relief and pull-strength termination with controlled cable impedance 10 for a transmission cable 12. The termination includes a carrier 14 and a housing 16. The carrier includes at least one flat portion 18 for receiving the transmission cable 12 and at least one tab portion 20 extending from the flat portion 18. In the preferred embodiment of the present invention, multiple tabs 20 extend upward from the opposite sides of the flat portion 18 forming a channel-like structure 22 for the transmission cable 12. Also in the preferred embodiment, the carrier 14 includes a flat portion 24 for accepting a substrate or the like to be described in greater detail below. The tabs 20 extending from the flat portion 18 of the carrier 12 may also extend laterally outward from the flat portion 18 forming a planar structure instead of the channel-like structure 22.

The housing 16 has a tab 26 formed therein that is bendable from a first position to a second position for engaging one or more of the tabs 20 on the carrier 14. The housing 16 may also have apertures 28 formed therein for providing access to components disposed within the housing 16. In the preferred embodiment of the invention, the housing 16 has an elongate rectangular shape. The shape of the housing 16 is not limited to the rectangular shape shown and other configuration are possible, such as tubular, semicircular, or the like, without departing from the scope of the attached claims. Additionally, the strain relief and pull-strength termination with controlled cable impedance 10 of the present invention is not limited to a single tab 26 formed in the top of the housing 16 as shown in FIG. 1. Alternate implementations of the invention include providing tabs 26 on opposite sides of the rectangular shaped housing 16 that engage the planar configured tabs 20 of the carrier 14.

The flat portion 18 of the carrier 14 receives the transmission cable 12. The termination 10 of the present invention will be shown and described using a coaxial cable as the transmission cable 12. It is understood that other types of transmission cable may equally be used with the present termination without departing from the scope of the appended claims. For example, an optical fiber transmission cable may be used with the termination 10 of the present invention. The transmission cable 12, in the form of a coaxial cable, has a center conductor 30 surrounded by a shielding conductor 32 with insulating material 34 separating the center conductor 30 from the shielding conductor 32. Surrounding the shielding conductor 32 is an outer insulating sheath 36. Generally, the shielding conductor 32 in a coaxial cable is made of many strands of fine wire braided together in one or more layers. The coaxial cable 12 is positioned in the carrier 14 with the braided shielding conductor 32 disposed in the channel-like structure 22. The shielding conductor 32 is secured to the carrier 14 by soldering or other appropriate securing means that does not alter the characteristic impedance of the transmission cable 12. Another type of securing means is gluing the transmission cable 12 to the carrier 14 using an adhesive, such as epoxy or the like.

The carrier 14 is positioned within the housing 16 with the tabs 20 of the carrier 14 extending past the tab 26 of the housing 16. The tab 26 is bend downward into the housing so that the tabs 20 engage the tab 26 when a pulling force is applied to the transmission cable 12. The interlocking tabs 20 and 26 provide the strain relief and pull strength for the transmission cable 12 without the need for crimping the cable within the housing 16 as is done with prior cable strain relief apparatus and methods.

Figures 2, 3:
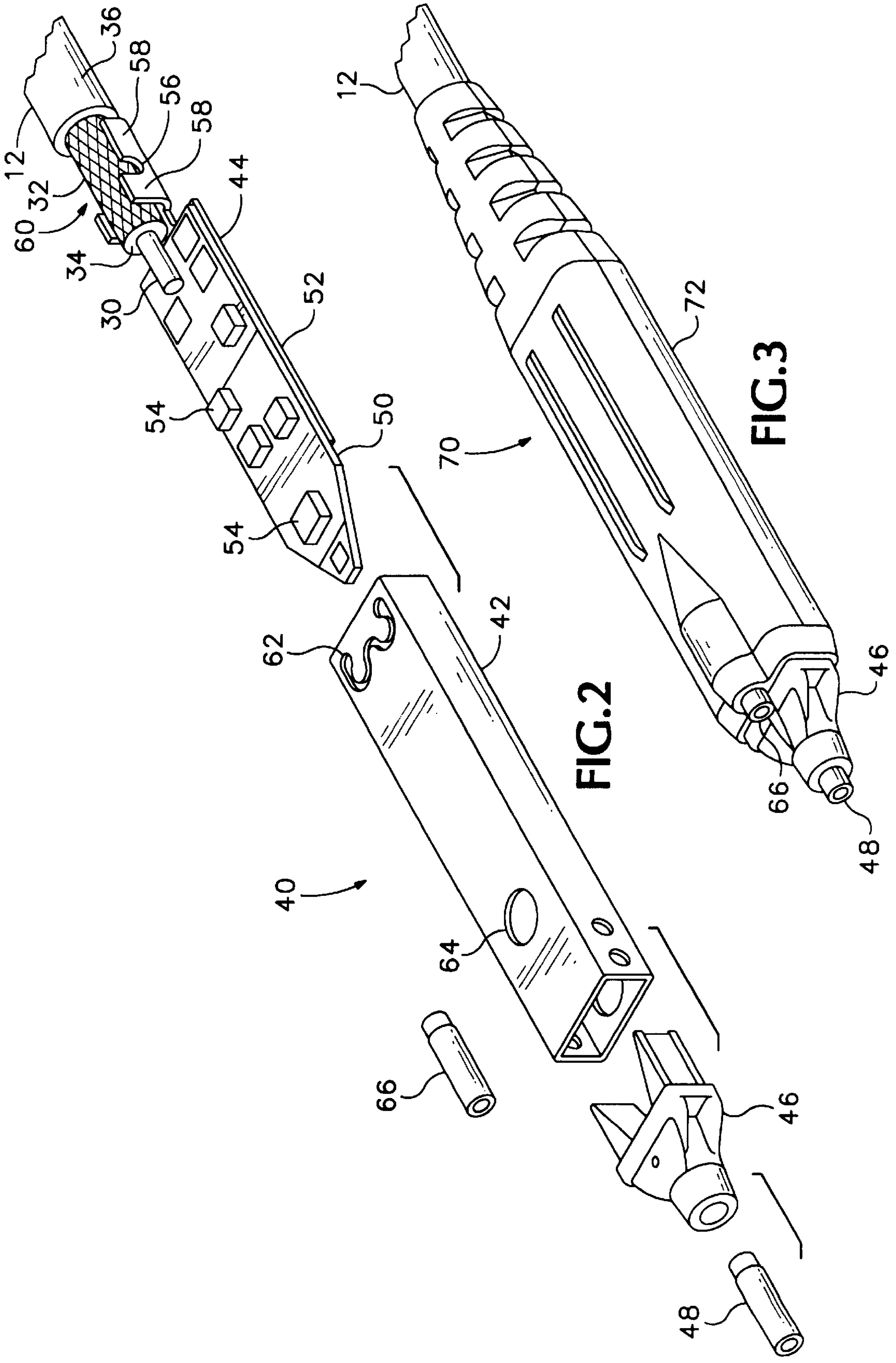
FIG. 2 is a exploded perspective view of the probe head of a measurement probe incorporating the strain relief and pull-strength termination with controlled cable impedance according to the present invention.
FIG. 3 is a perspective view illustrating a probe head of a measurement probe incorporating the strain relief and pull-strength termination with controlled cable impedance according to the present invention.

Referring to FIG. 2, there is shown an exploded perspective view of the strain relief and pull-strength termination 10 with controlled cable impedance incorporated into a probe head 40 of a measurement probe. The probe head 40 has an elongate electrically conductive housing 42 and a carrier 44 similar to the carrier and housing shown in FIG. 1. Disposed within one end of the housing 42 is an plug 46 of insulating material having a probing tip 48 extending there through. One end of the probing tip 48 accepts a variety of probing adapters (not shown) for electrically connecting the probing tip to a device under test. The other end of the probing tip 48, which is exposed within the housing 42, is electrically connected to a substrate 50 secured to one of two flat portions 52 of the carrier 44. In the preferred embodiment of the present invention, the substrate 50 is secured to the carrier by soldering and glueing using an epoxy adhesive. Mounted on the substrate 50 are electrical components 54, such as passive resistor and capacitor components, and/or active components, such as integrated circuit and/or transistor, for compensating the probe and/or terminating the electrical signal output of the substrate 50 in the characteristic impedance of the transmission cable 12. Another flat portion 56 of the carrier 44 extends from the first flat portion 52 and has tabs 58 extending from either side of the flat portion 56. The second flat portion 56 and the tab portions 58 form a channel-like structure 60 for accepting the transmission cable 12.

The transmission cable 12 is prepared for the carrier 44 by removing a portion of the outer insulating sheath 36 from one end of the cable to expose the shielding conductor 32. A portion of the shielding conductor 32 and the insulating material 34 is removed from the end of the cable to expose the center conductor 30. The prepared end of the cable 12 is positioned on the carrier 44 with the exposed shielding conductor 32 disposed in the channel-like structure 60 formed by the second flat portion 56 and the tabs 58. The center conductor 30 is positioned on the substrate 50 and electrically connected to the electrical circuitry thereon. The shielding conductor 32 and the center conductor 30 are respectively soldered to the channel-like structure and the substrate 50.

The prepared assembly, consisting of the carrier 44, substrate 50 and transmission cable 12, is positioned within the housing 42 with the tabs 58 extending past tab 62 formed in the housing 42. The tab 62 is bent from its first formed positioned to a second position within the housing 42 for engaging the tabs 58 on the carrier 44. The tabs 58 and 62 are positioned in engaging contact and the carrier 44 and substrate are secured within the housing 42. In the preferred embodiment of the invention, the carrier 44 and substrate 50 are secured within the housing by soldering. Apertures 64 are formed in the housing 42 to allow access to the substrate 50 and components 52 thereon, for securing additional components to the substrate 50. For example, the large aperture 64 on the top of the housing 42 may be used for soldering the probing tip 48 to the substrate 50. Further, a second probing tip 66 may be connected to housing 42 or a ground contact on the substrate for providing a grounded probing tip on the probe head 40.

In the preferred embodiment of the invention, the housing 42 for the probe head is an elongate rectangular shaped tubular body formed of brass coated with sulfimate-nickel having a thickness in the range of 100 to 200 micro inches. The sides of the tubular body are nominally 0.125 inches and 0.250 inches with a length in the range of 1.195 inches. The walls of the tubular body have a nominal thickness of 0.014 inches. The tab 62 on the housing 42 is nominally positioned 1.055 inches from the front edge of the housing with the front edge as being defined as the end of the housing accepting the probing tip plug 46. The tab 62 is formed in the housing 42 using well known machining processes that produce a tab having a nominal width from side to side of 0.128 inches and a length of 0.066 inches. The corners of the machined tab 62 are radiused for strain relief and the center portion of the tab 62 has an indentation formed therein having a nominal radius of 0.043 inches forming mirrored tips on the tab 62.

The carrier 44 is formed from brass having a nominal thickness of 0.013 inches and plated with gold having a nominal thickness from 3 to 8 micro inches over an electroless nickel having a nominal thickness of 0.00005 inches. The carrier 44 has an over all length in the range of 0.970 inches and a width of 0.170 inches. The flat portion 52 receiving the substrate 50 has a nominal length of 0.710 inches and a width of 0.170 inches. The channel-like structure 60 that receives the transmission cable 12 may be integrally formed with the flat portion 52 as is done in the preferred embodiment. The flat portion 56 of the channel-like structure 60 has a nominal width of 0.055 inches and an overall length of 0.260 inches. The tabs 58 are formed on opposite sides of the flat portion 56 with one set of opposing tabs 58 starting at a nominal 0.040 inches from the junction of the flat portions 52 and 56 and having a nominal height of 0.089 inches from the bottom of the carrier 44. A second set of opposing tabs 58 have a nominal height of 0.063 inches from the bottom of the carrier 44. The two sets of tabs are separated from each other by a radiused opening having a radius of 0.025 inches.

Referring to FIG. 3, there is shown a perspective view illustrating a probe head 70 of a measurement probe incorporating the strain relief and pull-strength termination with controlled cable impedance according to the present invention. Like elements from the previous figures are the same in FIG. 3. The probe head 70 includes the probing tip 48 disposed in the insulating plug 46. The ground probing tip

66 is mounted on the housing adjacent to and in close proximity to the probing tip 48. Extending from the opposite end of the probe head 70 is the transmission cable 12.

Insulating material 72 is formed around the housing 42, a substantial portion of the ground probe tip 66 and a portion of the transmission cable 12. The insulating material 72 electrically isolates the conductive elements of the probe head 70 and provides strain relief for the transmission cable 12 at the probe head 70 cable 12 interface. In the preferred embodiment of the invention, the insulating material is an injected molded part that is placed around the housing 42, ground probe tip 66 and the end of the transmission cable 12.

A strain relief and pull-strength termination with controlled impedance for a transmission cable has been described. The termination includes a carrier and a housing with each having tabs that interlock in the assembled position to provide the strain relief and pull-strength termination. The carrier has a flat portion and extending tab portions that form a channel-like structure for receiving the transmission cable.

The transmission cable is prepared by exposing the shielding conductor of the cable, if present, and securing the cable to the carrier by soldering. Alternately, the cable may be secured to the carrier using an adhesive, such as epoxy or the like. The carrier is positioned within the housing and the housing tab is bent to engage the carrier tab. The interlocking tabs provides for the strain and pull-strength for the cable without having to crimp the cable within the housing. Thus the characteristic impedance of the cable is maintained. The strain relief and pull-strength termination with controlled impedance is usable in a probe head for an electrical measurement probe.

It will be obvious to those having skill in the art that many changes may be made to the details of the above-described embodiments of this invention without departing from the underlying principles thereof. The scope of the present invention should, therefore, be determined only by the following claims.

What is claimed is:

1. A controlled impedance strain relief and pull-strength for a transmission cable comprising:

an electrically conductive carrier having a flat portion and at least one tab portion extending from the flat portion with the flat portion accepting one end of the cable where the cable is a coaxial cable having a center conductor surrounded by a shielding conductor with an insulating material separating the center conductor from the shielding conductor;

a solder connection between the shielding conductor and the electrically conductive carrier that secures the cable to the carrier with a controlled impedance; and a housing receiving the carrier and having a tab formed in the housing that is movable from a first to a second position with the housing tab engaging the carrier tab portion in the second position.

2. The controlled impedance termination as recited in claim 1 wherein the at least on tab portion further comprises a plurality of tab portions extending from the flat portion.

3. The controlled impedance termination as recited in claim 2 wherein the flat portion of the carrier has an axial dimension with the tab portions extending upward from the flat portion parallel with the axial dimension.

4. A probe head for a measurement probe having a controlled impedance termination for a transmission cable comprising:

a carrier having a flat portion and at least one tab portion extending from the flat portion with the flat portion accepting one end of the cable;

means for securing the cable to the carrier with a controlled impedance;

a substrate secured to the other end of the flat portion and electrically connected to the transmission cable;

a housing receiving the carrier at one end and having a tab formed in the housing adjacent to the end of the housing receiving the carrier that is movable from a first to a second position with the housing tab engaging the carrier tab portion in the second position; and a probing tip extending from the other end of the housing and electrically connected to the substrate.

5. The probe head as recited in claim 4 wherein the at least one tab potion further comprises a plurality of tab portions extending from the flat portion.

6. The probe head as recited in claim 5 wherein the carrier has an axial dimension with the tab portions extending upward from the flat portion parallel with the axial dimension.

7. The probe head as recited in claim 4 wherein the securing means comprises an adhesive.

8. The probe head as recited in claim 7 wherein the adhesive is an epoxy glue.

9. The probe head as recited in claim 4 wherein the carrier comprises an electrically conductive material and the cable is a coaxial cable having a center conductor surrounded by a shielding conductor with an insulating material separating the center conductor from the shielding conductor and the securing means comprises solder applied to the shielding conductor and the electrically conductive carrier.

10. The probe head as recited in claim 4 further comprising a body of insulating material surrounding the housing and a portion of the cable extending from the housing.

* * * * *